United States Patent [19]

Macbeth

[11] 4,056,440
[45] Nov. 1, 1977

[54] HEAT TRANSFER CHANNELS

[75] Inventor: Robert Victor Macbeth, Bournemouth, England

[73] Assignee: United Kingdom Atomic Energy Authority, London, England

[21] Appl. No.: 581,431

[22] Filed: May 28, 1975

[30] Foreign Application Priority Data

June 3, 1974 United Kingdom ............... 24424/74

[51] Int. Cl.² .............................................. G21C 3/30
[52] U.S. Cl. ........................................ 176/78; 176/75
[58] Field of Search ............................ 176/78, 73, 75

[56] References Cited

U.S. PATENT DOCUMENTS

| | | | |
|---|---|---|---|
| 3,031,388 | 4/1962 | Barchet | 176/78 |
| 3,068,163 | 12/1962 | Currier | 176/78 |
| 3,070,537 | 12/1962 | Treshow | 176/78 |
| 3,071,527 | 1/1963 | Young | 176/78 |
| 3,179,571 | 4/1965 | Schabert | 176/78 |
| 3,309,279 | 3/1967 | Ritz | 176/78 |
| 3,330,736 | 7/1967 | Cousseran | 176/78 |
| 3,361,640 | 1/1968 | Hassig | 176/78 |
| 3,441,477 | 4/1969 | Stamford | 176/38 |
| 3,625,822 | 12/1971 | Mantle | 176/78 |

FOREIGN PATENT DOCUMENTS

| | | | |
|---|---|---|---|
| 291,909 | 5/1967 | Australia | 176/38 |

*Primary Examiner*—Samuel W. Engle
*Assistant Examiner*—Donald P. Walsh
*Attorney, Agent, or Firm*—Larson, Taylor and Hinds

[57] ABSTRACT

Nuclear fuel rods, or other heat emitting rod like bodies are arranged in a coolant channel in a cluster spaced apart from one another and from the channel wall. The channel contains a number of lattice positions uniformly distributed over the flow section there being an odd number of positions in an outer annular row adjacent the channel wall occupied by nuclear fuel rods for example. This discourages coolant flow patterns deleterious to high heat flux.

9 Claims, 12 Drawing Figures

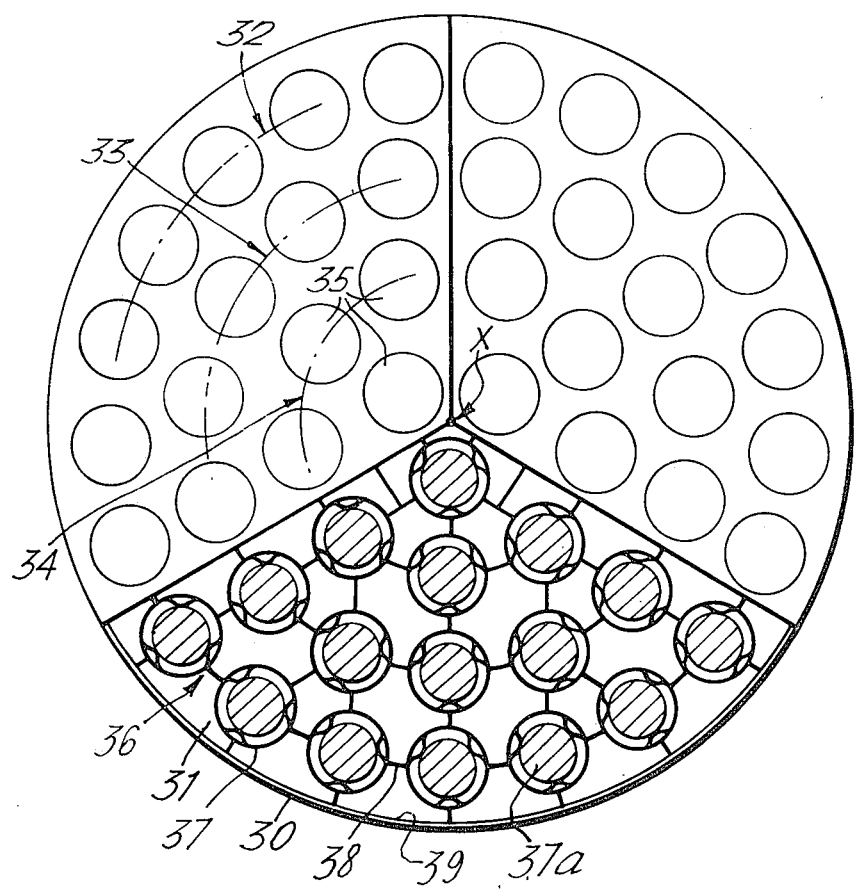

HEAT TRANSFER CHANNELS

BACKGROUND OF THE INVENTION

This invention relates to heat transfer channels in heat exchange systems, mainly certain types of nuclear reactors, wherein a plurality of elongated heat emitting members are supported within a channel through which a heat receiving liquid passes and as a result undergoes boiling. Boiling in this context includes sub-cooled boiling, such as is allowed in pressurised water cooled nuclear reactors, as well as bulk boiling as occurs in both boiling water nuclear reactors and in steam generating nuclear reactors. The invention aims to improve heat transfer between the heat emitting members and the fluid.

SUMMARY OF THE INVENTION

According to the invention a heat transfer channel comprises a channel wall, bounding a number of regularly spaced lattice positions, an inlet for a heat-receiving liquid coolant at one end, an outlet for a two phase liquid/vapour mixture at the other, a plurality of elongated, heat emitting members supported on lattice positions in the channel in rows between the inlet and the outlet, in spaced apart relation to one another and to the channel wall so as to present parallel surfaces to the coolant passed along the channel, the spacing between the members being such that there is an odd number of lattice positions in the outer row adjacent the channel wall occupied by heat emitting members. It is considered that the odd number of members in the outer row will avoid the onset of a flow pattern in the coolant which appears to limit the heat flux. The heat emitting members may be the tubes of a tube-in-shell heat exchanger, the channel then being defined by the shell wall. The heat emitting members may be nuclear fuel rods arranged in a bundle or group shrouded along its longitudinal sides by a channel wall eg pressure tube or wrapper or shroud so forming a nuclear reactor coolant channel employing a two phase-fluid, such as light or heavy water, as coolant. One or more of the lattice positions other than those in the outer row may be occupied by an auxiliary coolant tube designed to inject coolant into the channel generally transverse the main coolant flow direction. Preferably the lattice positions are in concentric annular rows about a central lattice position occupied by a central auxiliary cooling pipe.

Advantageous heat transfer performance may be obtained by arranging an odd number of nuclear fuel rods in the outer row of lattice positions and preferably there are more than two rows of lattice positions occupied by fuel rods. The rows are preferably concentric. The actual number of lattice positions in the inner rows may be an even number or an odd number but preferably there is an odd number in every row, for example there may be 21 rods in the outer row, 15 lattice positions in the intermediate row and 9 lattice positions in an inner row. A still further inner row of 3 lattice positions may be provided or this may be a single auxiliary coolant pipe. Any one or more lattice positions in the intermediate rows may be occupied by an auxiliary cooling tube or so called sparge pipe. It is considered expedient to follow the practice to so space the rods that the minimum distance between the outer surface of the rods in the outermost row and the inner surface of the channel wall is marginally less than the minimum distance between the outer surfaces of adjacent fuel rods. Contributory to the gaining of advantages of the invention there may be provided nuclear fuel rod support structure affording a plurality of lattice points in concentric rows, the structure being such that an odd number of lattice points occur in the outermost row, the remaining lattice points being distributed substantially evenly within the space bounded by said outer row. A variety of sequences in the numbers of lattice points in consecutive circular, or polygonal, rows are proposed eg a sequence of six: 27; 21; 15; 9; 3; gives lattice points where every row is odd; a sequence of five: 25; 20; 15; 10; 5; where alternate rows are odd or an irregular sequence 19; 16; 7. Other sequences are possible within the rule that at least the outer row has an odd number of lattice points and these occupied by heat emitting rods. In the above sequences there may be a central lattice position occupied by an auxiliary cooling tube.

The wrapper or shroud need not be continuous. A number of such fuel rod bundles with shrouds make up a nuclear reactor core.

DESCRIPTION OF THE DRAWINGS

The invention and several embodiments thereof as applied to heat exchanger or nuclear fuel assemblies will now be described with reference to the accompanying drawings in which

FIG. 8 shows diagrammatically an end view of a channel wall bounding a flow channel containing 48 uniformly distributed lattice points in concentric rows, each row containing an odd number of lattice points;

DESCRIPTION OF THE PREFERRED EMBODIMENTS

Figure 1:
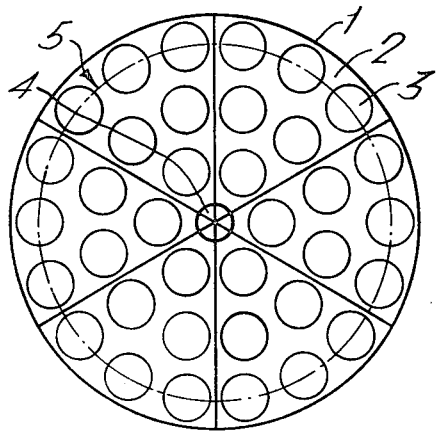
FIG. 1 shows in diagrammatic plan view showing relative lattice positions for a cluster of 36 heat emitting rods arranged in accordance with the prior art and bounded by a cylindrical channel wall.
Figure 2:
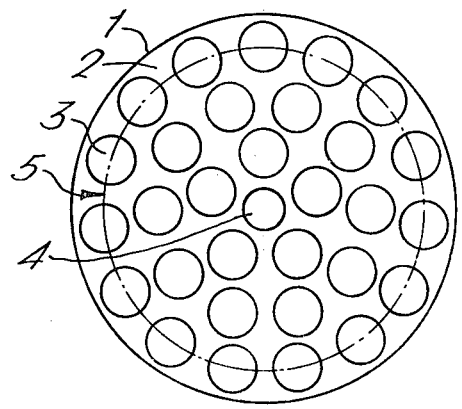
FIG. 2 shows a view similar to FIG. 1 showing lattice positions for a cluster of 30 heat emitting rods arranged in accordance with the invention, the rods being disposed in concentric rows with an annular outer row of 15 rods adjacent the cylindrical channel wall.
Figure 4:
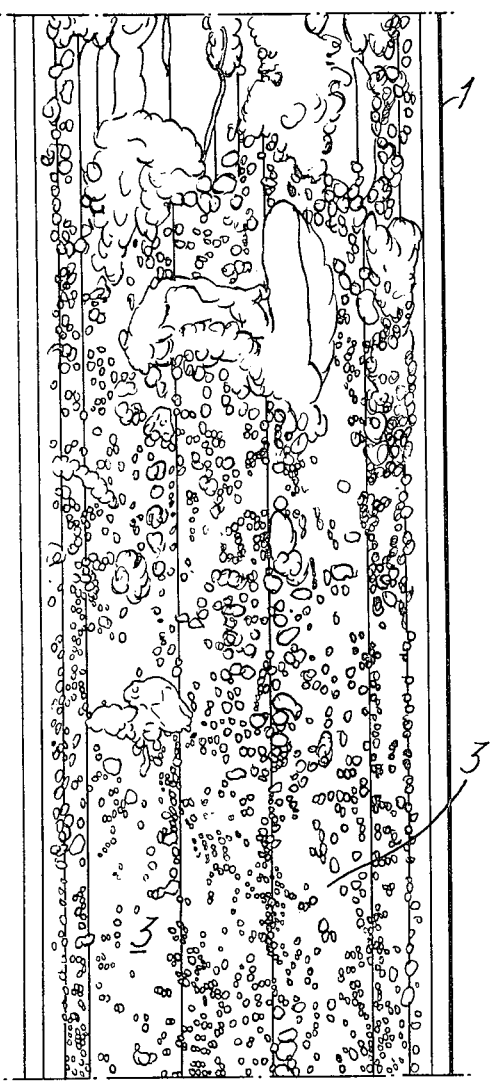
FIGS. 4 and 5 are tracings made from photographs taken through a transparent window in a coolant channel wall to show in FIG. 4 the flow conditions set up with an outer annular row containing an even number of rods and in FIG. 5 the flow conditions set up with an outer annular row containing an odd number of rods.
Figure 5:
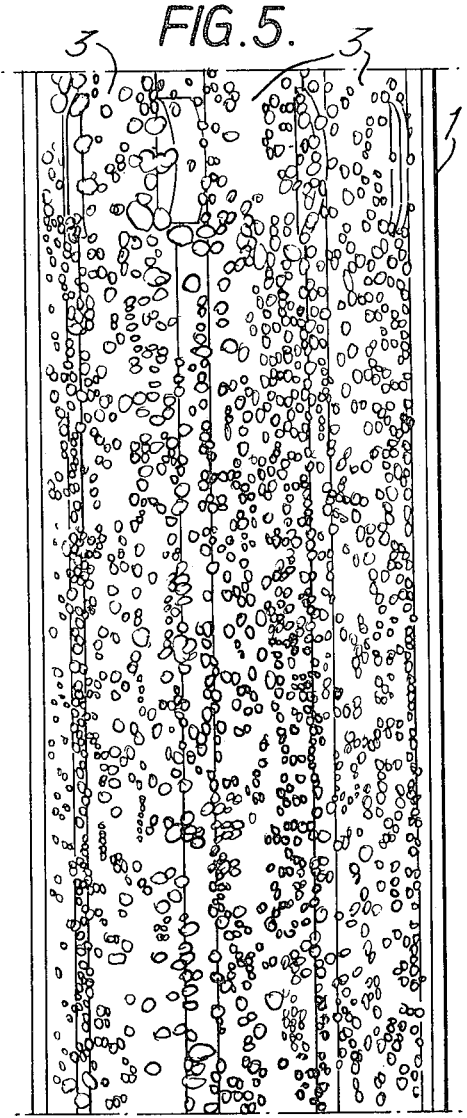

In both FIG. 1 and FIG. 2 of the drawing the reference 1 indicates a cylindrical wall of a coolant channel 2 which is open ended and defines a forced convection flowpath for coolant. Within the channel of FIG. 1 are supported at the lattice positions indicated 36 heat emitting rods 3 and within the channel of FIG. 2, 30 similar rods 3. The rods 3 are supported in parallel spaced apart positions as shown. Those in FIG. 1 are arranged about a central pipe 4 to give flow symmetry with an even number of rods 3 in the outer row 5 adjacent the channel wall 1. In FIG. 2 the rods are arranged so that flow symmetry is discouraged and this is done by spacing an odd number of rods in the outer row 5. The ends of each channel 2 were separately connected into a circuit through which Freon (RTM) was pumped. The rods, which were electrical conductors, were heated by electrical resistance heating and an inlet sub-cooling of 23.26 Joules per gram of the Freon was permitted. The dry out power of the rods was measured and plotted against mass flow rate of Freon (kg/sec) as abscissa and it was found that the arrangement of FIG. 1 gave a consistently lower dry out power than rods arranged as shown in FIG. 2. To visually determine the effects of the two arrangements on the flow pattern of coolant in forced convection two phase flow, a further investigation was made using a coolant channel having a transparent panel for visual inspection. The overall channel was necessarily smaller diameter due to the pressure involved and contained a single annular row of heat-emitting rods in Freon. FIG. 4 shows the bubble pattern which was photographed through the transparent panel in the channel wall containing the even numbered row and shows a spiral bubble pattern with large floppy vapour bubbles. FIG. 5 is the corresponding view with an odd number of rods in the annular row adjacent the channel wall. A stiff flow of uniformly sized bubbles is observed. Apart from the difference in the number of rods in the row adjacent the channel wall, every attempt was made to maintain identical conditions during each of these investigations.

Those familiar with the art will already be aware of the validity of Freon modelling for obtaining, via empirical scaling laws, heat transfer data applicable to forced convection two phase flow. Confirmation of this is to be found in ASME Publication 70-HT-20 which contains a paper "The Use of Freon 12 to model convection burn out in Water" (G F Stevens and R V Macbeth). This paper is also of interest because it discusses the modelling technique applied to a 36 rod bundle of heat emitting nuclear fuel rods corresponding to that referred to above as belonging to the prior art.

In pursuance of the foregoing, the inventor has pointed to a parameter in nuclear fuel bundle design which may be varied quite simply with the reasonable expectation of improved dry out performance. This is the number of fuel pins which occupy the outer row of the bundle in close adjacency to the channel wall. The latter being a pressure tube, a wrapper, a shroud or the like.

To this end, the following assemblies have been designed in which the heat emitting rods, referred to earlier, are canned nuclear fuel pellets eg of $UO_2$ so called fuel rods.

Figure 6:
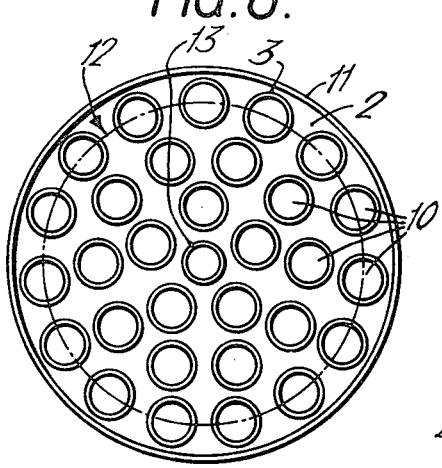
FIG. 6 shows diagrammatically an end view of a cluster of a nuclear fuel rods within a pressure tube for a pressure tube nuclear reactor of the steam generating, heavy water moderated type, the rods being based on the lattice configuration shown in FIG. 2.

I A nuclear fuel assembly as shown in FIG. 6 comprising thirty nuclear fuel rods 10 supported, axes parallel, by grids not shown within a cylindrical pressure tube 11. The grids have spaces to define 15 lattice positions in the outer annular row 12 and these are occupied by nuclear fuel rods; the remaining lattice positions are based on a pentagonal pattern about a central tube 13. The ends of the pressure tube are connected into a forced convection coolant channel in which boiling of water generates steam in contact with the rods.

Figure 7:
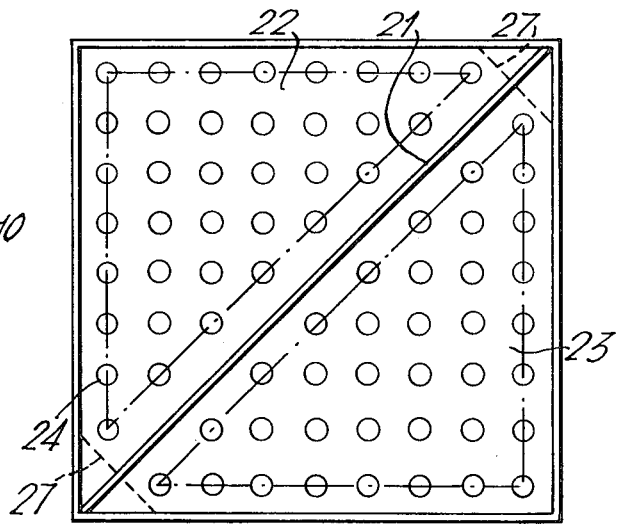
FIG. 7 shows diagrammatically an end view of a channel wall bounding a flow channel containing lattice points in polygonal rows suitable for use in so called boiling or pressurised water nuclear reactor.
Figure 3:
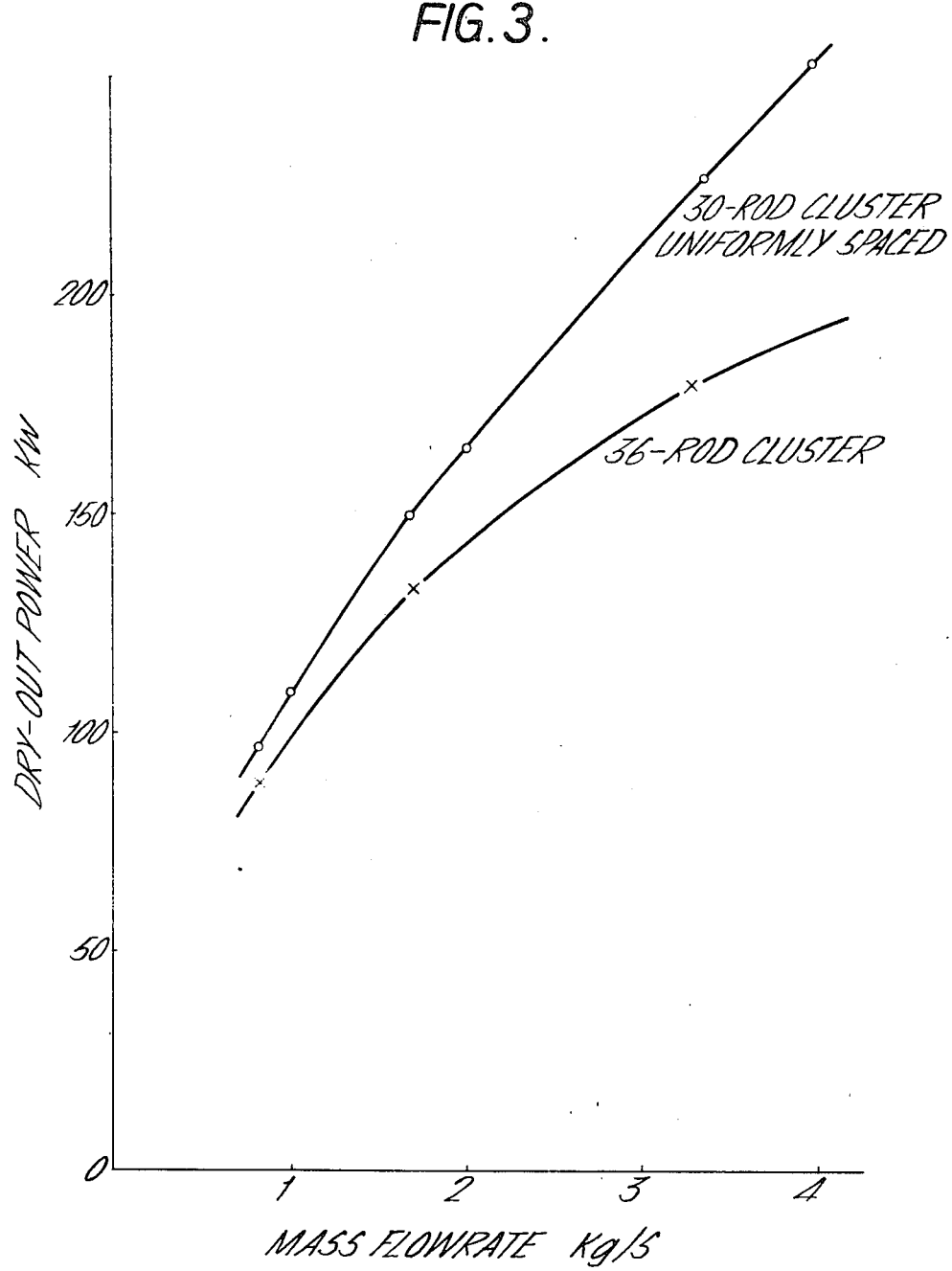
FIG. 3 shows a graph illustrating some comparative trials to assess dryout when the rods arranged at lattice positions as in FIG. 1 and FIG. 2 are cooled by forced convection cooling.

II A nuclear fuel assembly as shown in FIG. 7 is suitable for use on a boiling water nuclear reactor, or in a pressurised water nuclear reactor operated with a degree of sub-cooled boiling. The assembly comprises an external tubular square section wrapper 20 of thin zirconium alloy sheet which is carried by a grid (not shown). The interior of the wrapper 20 is divided diagonally by a plate 21 so forming two flow channels 22 and 23. The grids (not shown) provide an outer annular row of twenty-one lattice positions an intermediate row of twelve positions and an inner row of 3 positions. Nuclear fuel rods 24 occupy at least the lattice points in the outer annular row which lie on a polygon and at any selected ones of the other lattice points there may be positioned absorber rods, poison rods or auxiliary cooling sparge tubes instead of fuel rods. The corners 27 of the wrappers may be chamfered as shown to give common core space for control members etc as desired.

III A nuclear fuel assembly as shown in FIG. 8 having unique oddness. The channel wall 30 defines a channel 31 with forty eight lattice positions distributed uniformly across the flow area. These are arranged in concentric annular rows with 21 positions in the outermost annular row 32 adjacent the channel wall 30; 15 positions in the adjacent row 33, and 9 positions in the row 34. A further three lattice positions 35 are grouped about the channel axis X. A central sparge pipe for auxiliary coolant may occupy lattice positions 35 or one or more positions 35 may be occupied by nuclear fuel rods. Of course, fuel rods will occupy most of the lattice positions in rows 33 and 34 but some of these positions may be occupied by auxiliary coolant supply pipes instead of fuel rods. For the sake of completeness a sector of the assembly in FIG. 8 is shown with part of the fuel rod support grid. The grid 36 is composed of tubular ferrules 37 linked by metal strips 38 to one another and to an outer band 39. Each ferrule 37 locates a fuel rod 37a by means of resilient supports 37b at its correct lattice position.

The satisfactory results obtained by using the invented assembly leads one to look for a theory or a hypothesis which will explain the remarkable results. So far the inventor's work in this direction is incomplete and although he does not wish to be bound in any way by this or any particular theory, he wishes to offer the following hypothesis.

Figure 9A:
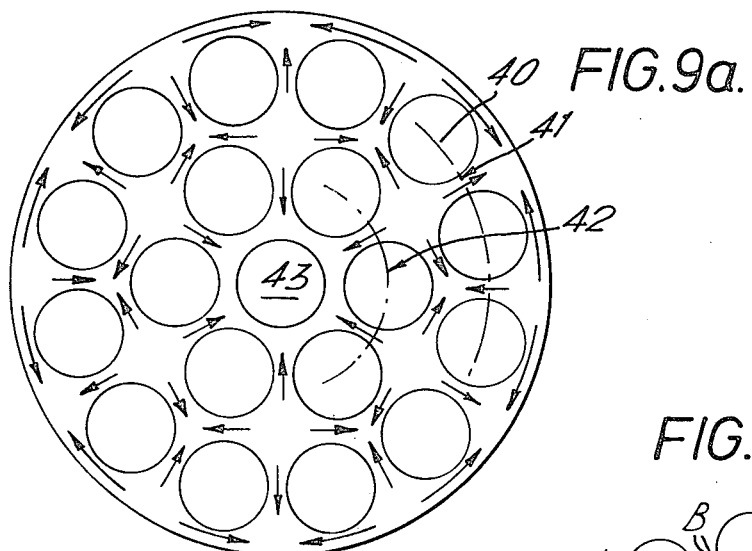
FIGS. 9a, 9b, 9c and 9d are diagrams used for demonstrating one non-binding hypothesis which may explain the advantageous operation of the invention.
Figure 9B:
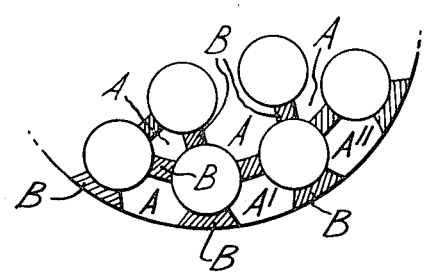

Consider for example a typical prior art cluster of nuclear fuel rods in FIG. 9a having twelve heat emitting rods 40 on lattice positions in the outer row 41 adjacent the tubular shroud 42, six rods in the intermediate row 42 and one rod or sparge pipe 43 at the centre of the cluster. Now the coolant area around the rods in the outer rods may be divided as shown in FIG. 9b as including areas A and areas B. The vapour formed in areas such as B must tend to move out of the sub-channel in order to follow its natural tendency to achieve a more even distribution. Although one might expect the resultant vapour bubbles to divide equally and to pass into adjacent sub-channel A' and A", there are grounds for questioning this assumption and for preferring to believe that the bubbles will all move one way first to A' and then after a short period pass wholly into A". This oscillatory behaviour will be superimposed on the flow direction of the bulk of the coolant parallel to the axes of the fuel rods. Support for this hypothesis may be gained from observing the behaviour of gas bubbles injected into the base of 51 reduced diameter of U-tube 50 and partially filled with liquid. See FIG. 9c. Before gas injection both vertical limbs 52, 53 will contain liquid to the same height. When gas is injected into the base of the tube at roughly its mid-point, the gas bubbles will be observed passing first up to the liquid surface in one limb and then to reverse and pass wholly into the other limb similarly reaching the liquid surface. This action will repeat at a definite period of about a few seconds. The reason why this oscillation occurs is easily deduced by inspection. When the gap first enters the U-tube a slightly greater amount of gas goes in one direction than in the other. Buoyancy forces created by the gas very quickly build up to drive water in the U-tube in this preferred direction until the buoyancy forces in the aerated U-tube limb are just counter balanced by the difference in gravitational head created. Inertia effects cause the system to go slightly beyond this equilibrium position however which leads to a flow reversal and gas injected then swings over to the other limb of the U-tube. So the oscillation is established. Consideration of this oscillation in flow currents from a bubble generating region within a liquid suggests comparison with the three adjacent sub-channels A' B A" which in 3-dimensional form may be analogous to a plurality of U-flow paths with the two limbs of the U-tube representing the sub-channels A', A", and the connecting base of the U-tube representing the sub-channel B.

Figure 9D:
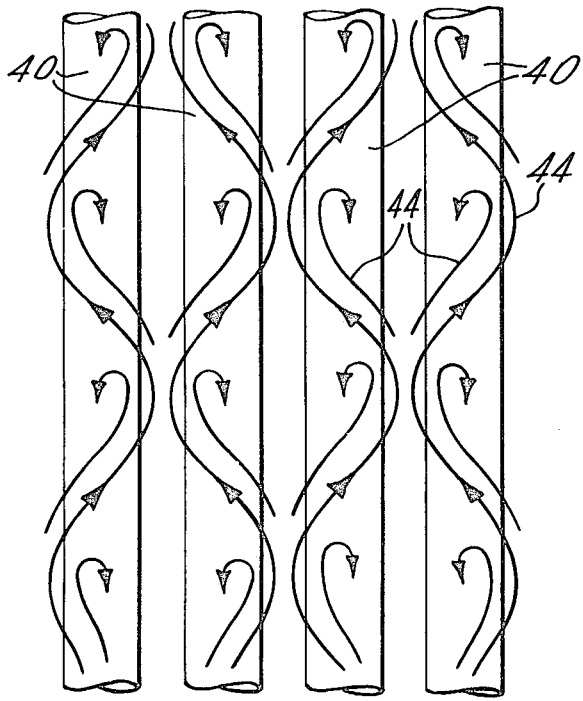
Figure 9C:
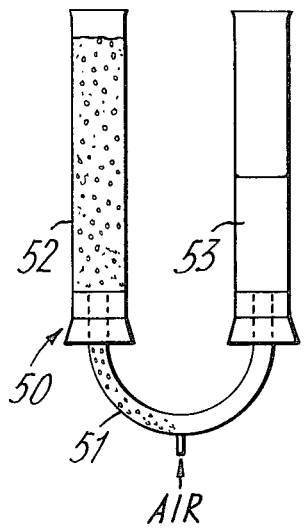

A similar situation may potentially exist in any adjoining group of sub-channels A, B at any position throughout the rod cluster. It only requires the oscillations, to synchronise with each other to produce a pattern shown in FIGS. 9a and 9d which illustrate as far as is possible in two dimensions the flow patterns which would suggest themselves in a fuel rod cluster having an even number of rods in the peripheral, annular row. The arrows in FIG. 9a show the synchronisation of the flow directions of transverse motion when viewed in plan whilst FIG. 9d shows the appearance of travelling sine wave motion produced as the coolant flow generally axially along the periphery of the cluster. These flow lines 44 indicate a degree of coolant stagnation and even local flow reversals.

The superposition of flow directions on an odd-cluster will demonstrate inability to achieve synchronism around the periphery of the cluster and hence transverse oscillations are muted.

Bearing in mind the photographic evidence illustrated in FIGS. 4 and 5, the conclusion that an odd numbered rod bundle assembly offers the advantage of higher dry-out powers and lower hydraulic resistance in water cooled reactors in which boiling occurs appears to be if not inescapable at least salutary.

It is the inventors opinion that a similar set of flow phenomena will occur in nuclear fuel rod clusters of gas cooled nuclear reactors but this has not been tried and so unlike water reactors is unsupported by experimental evidence. In fact the probable extension to gas coolant probably relies upon acceptance of the hypothesis just described for in a shrouded gas cooled fuel cluster the gas in sub-channels of the B type tends to get hotter than in A type sub-channels. Consequently there would be a relatively larger expansion of the gas in sub-channels B and this must lead to a flow of gas into sub-channels A. If synchronism were to become established around the cluster periphery as would be the case with an even number of sub-channels B then an oscillatory sine wave will be superimposed on the axially flowing coolant. The eddies produced would absorb coolant pressure drop wastefully putting a greater load on the gas circulators. Hence within the limits of the extended hypothesis an odd number of fuel rods in the outer periphery of the cluster of gas cooled reactors is to be recommended.

What we claim is:

1. A heat transfer channel comprising a channel wall, an inlet for a heat receiving liquid coolant at one end, an outlet for a two phase liquid/vapour mixture at the other, a plurality of elongated, heat emitting members supported in the channel by axially spaced grids in at least two annular concentric rows between the inlet and the outlet in spaced apart relation to one another and to the channel wall and extending parallel to one another and to the channel axis, the heat emitting members between the grids defining unobstructed passageways for coolant axially and radially, the members being held in position such that there is an odd number of members occupying the outermost row adjacent the channel wall.

2. A heat transfer channel as claimed in claim 1 in which the channel wall is a cylinder and the heat emitting members are supported within the cylinder in a number of coaxial annular rows, there being an odd number of heat emitting members comprising fuel rods in each row.

3. A heat transfer channel as claimed in claim 2 in which there are 21 rods in the outer first row, 15 in the next second row and 9 rods in the third row.

4. A heat transfer channel as claimed in claim 3 in which a fourth, innermost row has three rods.

5. A heat transfer channel as claimed in claim 2 in which the rods are centered around a sparge pipe, for supply of auxiliary coolant to the cluster.

6. An assembly as claimed in claim 1 in which the heat emitting members are fuel rods and the minimum distance between the channel wall and the surface of the fuel rods in the outermost row is less than the minimum distance between adjacent fuel rods in the assembly.

7. A nuclear reactor coolant channel having an axially extending channel wall, an inlet at the lower end for liquids and an outlet at the upper end for a two phase mixture, a plurality of nuclear fuel rods supported in the channel in at least two annular concentric rows by axially spaced grids, the fuel rod portions between the grids defining unobstructed passageways axially and radially for coolant, the grids positioning an odd number of fuel rods in the annular row adjacent the channel wall.

8. In a nuclear reactor core through which a liquid coolant passes and undergoes boiling, a coolant channel as claimed in claim 7 arranged in the coolant path to receive liquid coolant at its inlet end to flow through the channel, undergo boiling and pass from the outlet end.

9. In a heat exchanging system through which a liquid coolant flows and undergoes boiling, a heat transfer channel as claimed in claim 1 arranged in the coolant path to receive liquid coolant at its inlet end to flow through the channel, undergo boiling and pass from the outlet end.

* * * * *